United States Patent
Wolf

(10) Patent No.: US 6,535,303 B1
(45) Date of Patent: Mar. 18, 2003

(54) FACSIMILE COMMUNICATION DEVICES, COMMUNICATION SYSTEMS AND FACSIMILE COMMUNICATION METHODS

(75) Inventor: John P. Wolf, Eagle, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/304,525

(22) Filed: May 4, 1999

(51) Int. Cl.[7] .................................................. H04N 1/00
(52) U.S. Cl. ...................................... 358/434; 358/400
(58) Field of Search ............................... 358/434, 400, 358/464; 375/222

(56) References Cited

U.S. PATENT DOCUMENTS

| | | | | |
|---|---|---|---|---|
| 5,790,641 A | * | 8/1998 | Chan | 379/100.17 |
| 5,808,751 A | | 9/1998 | Hochman | 358/434 |
| 6,104,505 A | * | 8/2000 | Malik | 358/434 |
| 6,181,736 B1 | * | 1/2001 | McLaughlin | 375/222 |
| 6,445,468 B1 | * | 9/2002 | Tsai | 358/402 |

FOREIGN PATENT DOCUMENTS

JP    02000307794 A  *  11/2000  ............ H04N/1/00

OTHER PUBLICATIONS

Examiner's notes including 6 pages of notes of facsimile material well known in the art.*

* cited by examiner

Primary Examiner—Jerome Grant, II

(57) ABSTRACT

The present invention provides facsimile communication devices, communication systems and facsimile communication methods. According to one aspect of the present invention, a facsimile communication device comprises: a first input configured to receive a nonfacsimile destination designator; a second input configured to receive data to be communicated to the nonfacsimile destination designator; a processor configured to provide the nonfacsimile destination designator within a facsimile protocol file; and a facsimile modem coupled with the second input and adapted to communicate, using facsimile protocol communications, the data and the facsimile protocol file.

20 Claims, 4 Drawing Sheets

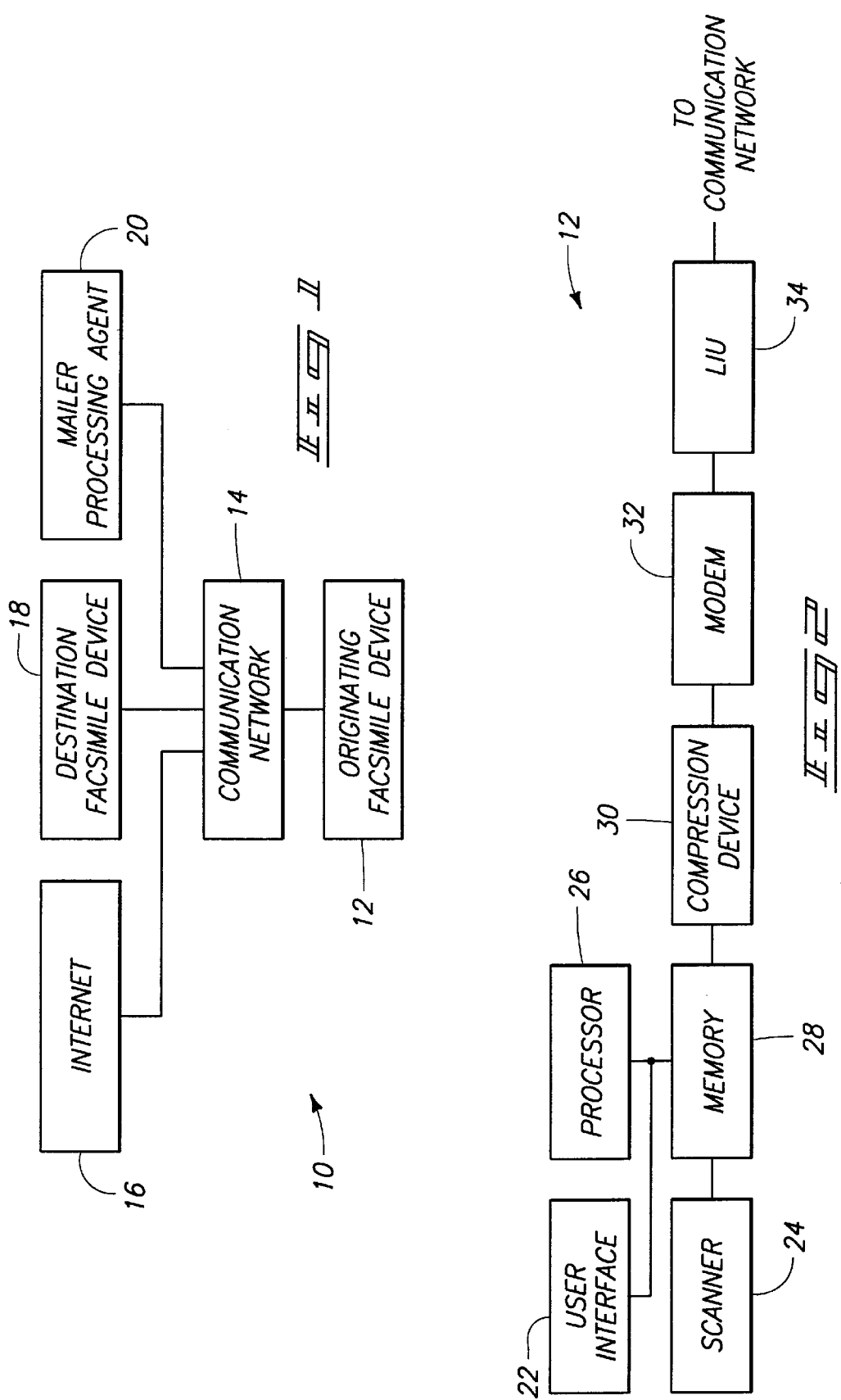

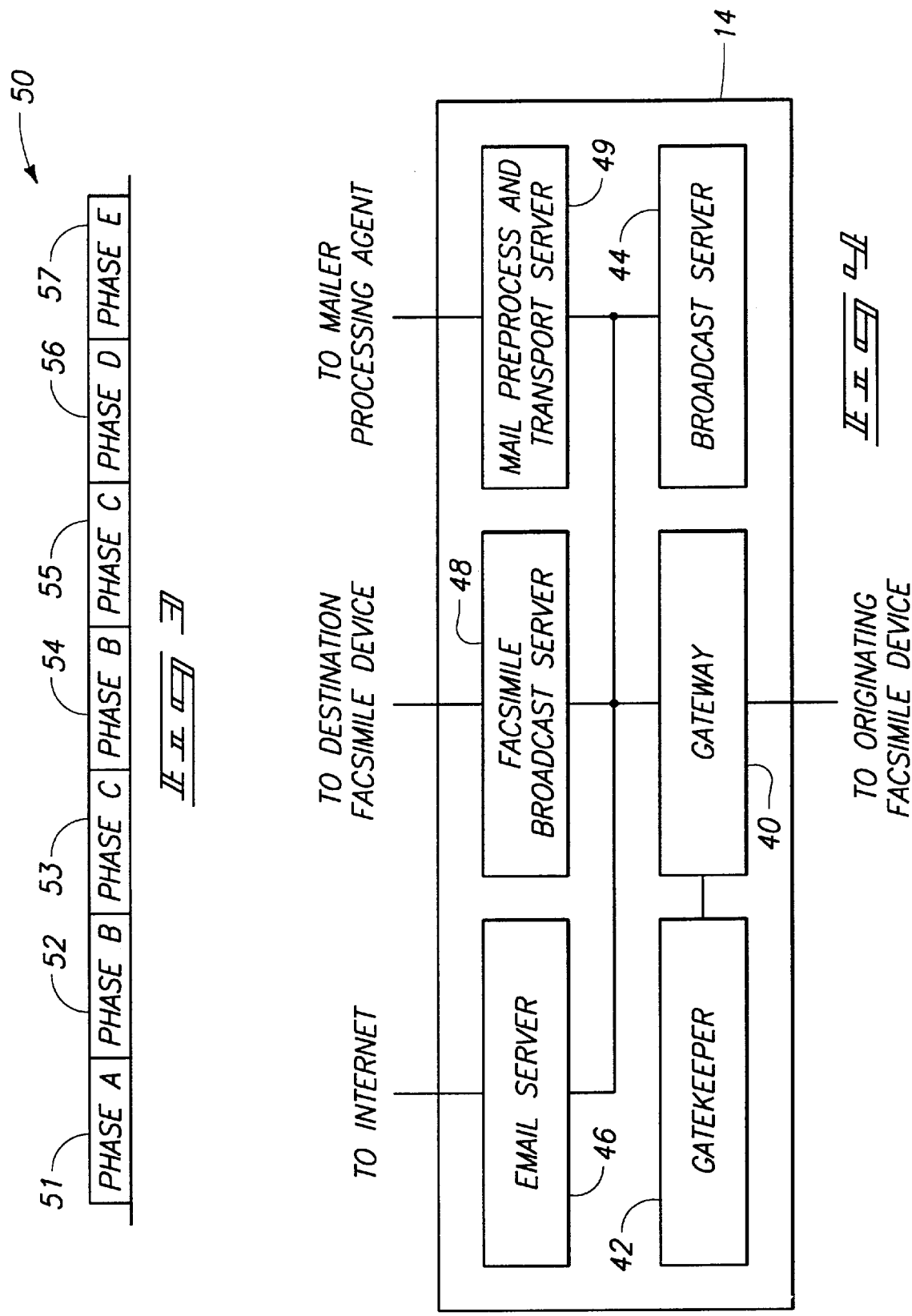

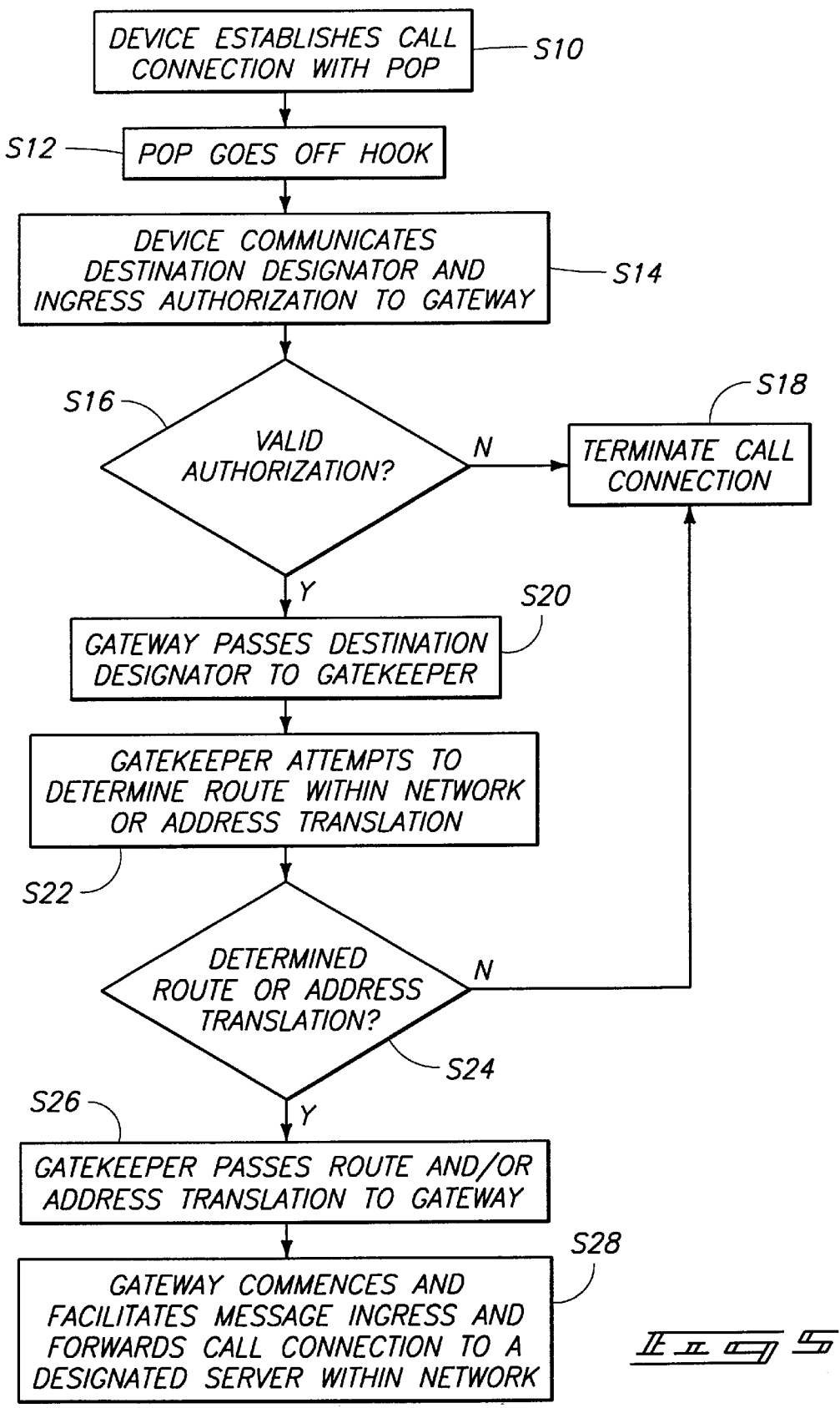

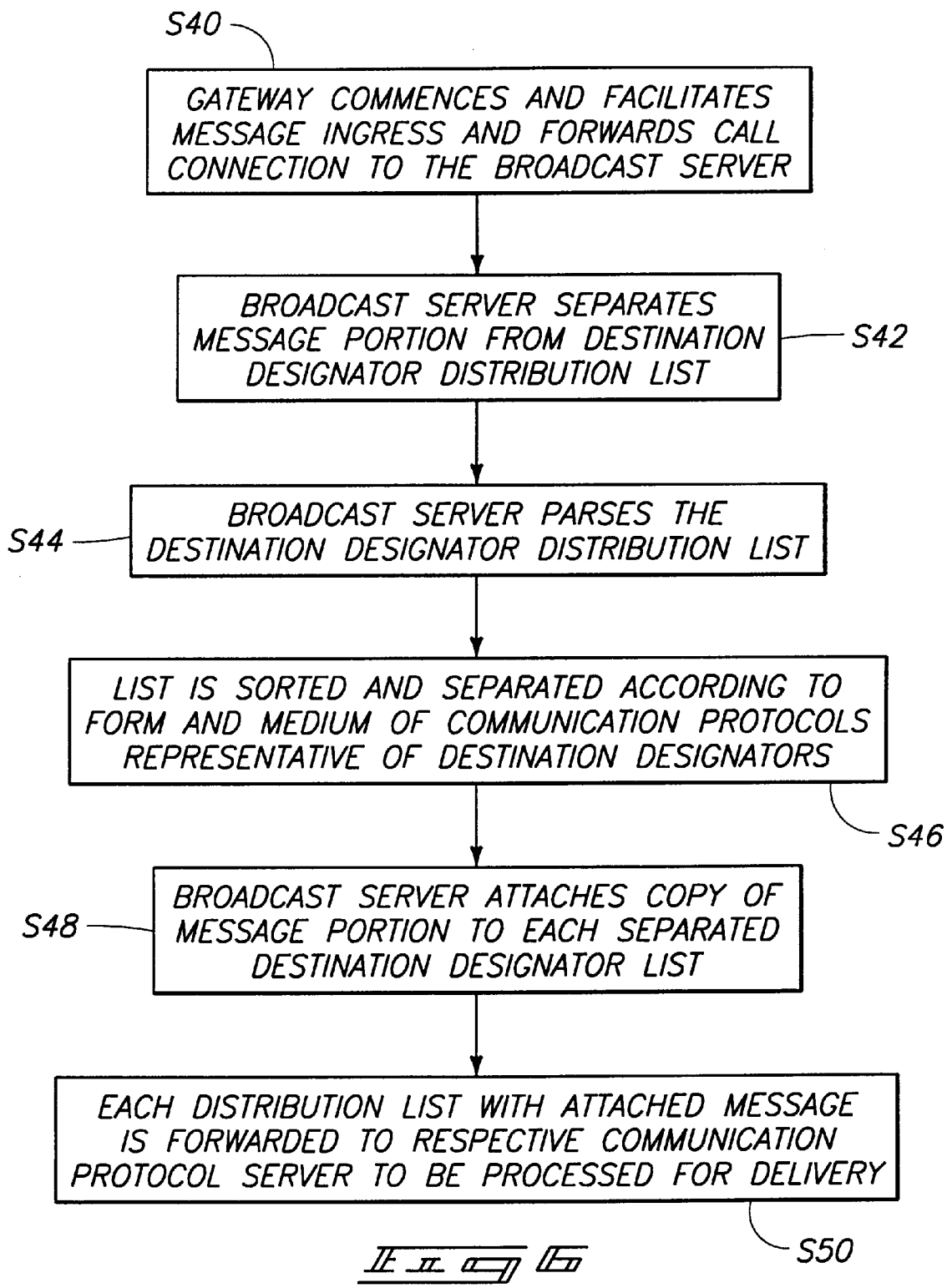

FACSIMILE COMMUNICATION DEVICES, COMMUNICATION SYSTEMS AND FACSIMILE COMMUNICATION METHODS

FIELD OF THE INVENTION

The present invention relates to facsimile communication devices, communication systems and facsimile communication methods.

BACKGROUND OF THE INVENTION

Facsimile devices have been utilized for numerous years to provide convenient transfer of documents between remotely located positions. Additional communication methods have been subsequently introduced for use in conjunction with facsimile devices to provide increased flexibility for facsimile data transfer between various remote locations.

For example, PC-Fax communication systems provide a personal computer having an appropriate card added as hardware to provide parallel functions of a facsimile device utilizing the personal computer. More specifically, such configured personal computers can take a text file or a binary file (e.g., a word processor file) and convert the data into a format suitable for transmission to a receiving facsimile device. The personal computer and receiving or destination facsimile device conduct communications in accordance with standard facsimile communication procedures.

Other expanded communication techniques provide even further communication capabilities for facsimile devices. For example, appropriately configured facsimile devices can communicate email messages to the Internet. Exemplary facsimile communication systems utilize Transmission Control Protocol/Internet Protocol (TCP/IP) as the transport for providing email messages to the Internet. Actual line protocol provides modulated signals upon the associated telephone line. An exemplary line protocol is Point-To-Point Protocol (PPP) to facilitate Internet Protocol transport. Point-To-Point Protocol provides such communications to the Internet utilizing a high-speed data modem.

While offering increased flexibility, such configurations have the associated drawback of requiring the use of relatively expensive hardware, such as the high-speed data modem for example. Further, common facsimile device configurations may require some alteration (i.e., the use of additional or different hardware) to implement additional functionality as opposed to the utilization of ubiquitous facsimile device configurations.

SUMMARY OF THE INVENTION

According to one aspect of the present invention, a facsimile communication device comprises: a first input configured to receive a nonfacsimile destination designator; a second input configured to receive data to be communicated to an address identified by the nonfacsimile destination designator; a processor configured to provide the nonfacsimile destination designator within a facsimile protocol file; and a facsimile modem coupled with the second input and adapted to communicate, using facsimile protocol communications, the data and the facsimile protocol file.

Another aspect of the invention provides a communication system comprising: a facsimile device including a facsimile modem and the facsimile device being configured to receive a nonfacsimile destination designator and data to be communicated to an address identified by the nonfacsimile destination designator, the facsimile device being further configured to provide the nonfacsimile destination designator into a facsimile protocol file and to communicate, using facsimile protocol communications, the data and the address identified by the facsimile protocol file to a communication network using the facsimile modem; and a communication network adapted to direct the data to the address identified by the nonfacsimile destination designator.

A facsimile communication method according to another aspect comprises: providing a facsimile communication device including a facsimile modem; receiving a nonfacsimile destination designator within the facsimile communication device; receiving data to be communicated to an address identified by the nonfacsimile destination designator within the facsimile communication device; providing the nonfacsimile destination designator within a facsimile protocol file; and communicating, using facsimile protocol communications, the data and the facsimile protocol file using the facsimile modem.

Other features and advantages of the invention will become apparent to those of ordinary skill in the art upon review of the following detailed description, claims and drawings.

DESCRIPTION OF THE DRAWINGS

Preferred embodiments of the invention are described below with reference to the following accompanying drawings.

FIG. 1 is a functional block diagram of one exemplary configuration of a communication system according to the present invention.

FIG. 2 is a functional block diagram of one exemplary configuration of an originating facsimile device of the communication system.

FIG. 3 is an illustrative representation of communications according to a T.30 ITU-T standard.

FIG. 4 is a functional block diagram of an exemplary communication network of the communication system.

FIG. 5 is a flow chart illustrating exemplary operations of the communication network responsive to the reception of a single protocol communication.

FIG. 6 is a flow chart illustrating exemplary operations of the communication network responsive to the reception of a heterogeneous broadcast message.

DETAILED DESCRIPTION OF THE INVENTION

The protection sought is not to be limited to the disclosed embodiments, which are given by way of example only, but instead is to be limited only by the scope of the appended claims.

This disclosure of the invention is submitted in furtherance of the constitutional purposes of the U.S. Patent Laws "to promote the progress of science and useful arts". (Article 1, Section 8).

Referring to FIG. 1, a communication system 10 embodying the present invention is illustrated. The illustrated communication system 10 is exemplary and other configurations are possible. Communication system 10 includes an originating facsimile device 12 coupled with a communication network 14. Communication network 14 is coupled with a packet-switched network, such as the Internet 16, a destination facsimile device 18 and a mailer processing agent 20 in the described embodiment.

Originating facsimile device 12 communicates, using facsimile protocol communications, data (e.g., image or text data) and a facsimile protocol file. The facsimile protocol file includes nonfacsimile destination designators which indicate addresses to receive the data via nonfacsimile communication systems (e.g., Internet 16, mailer processing agent 20). Facsimile destination designators may additionally be included within the facsimile protocol file which identify one or more destination facsimile devices 18 to receive the data (only one such destination facsimile device 18 is shown in FIG. 1). The data and facsimile protocol file may be communicated together to communication network 14 in a single call connection.

Turning now to FIG. 2, one configuration of originating facsimile device 12 is depicted. The illustrated originating facsimile device 12 includes a user interface 22, scanner 24, processor 26, memory 28, compression device 30, modem 32, and line interface unit (LIU) 34. Originating facsimile device 12 can be implemented as a stand-alone dedicated facsimile device, a personal computer which includes hardware for implementing facsimile communications, as well as other device configurations operable to provide facsimile communications.

Facsimile device 12 implements Group 3 and/or Group 4 facsimile communications in accordance with a T.4 standard of the Consultative Committee on International Telegraphy and Telephony (CCITT) and the International Telecommunications Union-Telecommunications Services Sector (ITU-T) in one aspect of the invention. An exemplary originating facsimile device 12 includes a HP3100 available from Hewlett-Packard Company.

User interface 22 permits an operator or user to control the operations of originating facsimile device 12. User interface 22 includes a telephony keyboard and a display in one configuration. User interface 22 provides an input which receives destination designators inputted by a user to identify the address of appropriate destination communication devices which are to receive communications from originating facsimile device 12.

As will be appreciated from the following, plural facsimile destination designators may be inputted via user interface 22. Such destination designators can include facsimile destination designators for forwarding communications to destination facsimile devices, as well as nonfacsimile destination designators for forwarding communications to nonfacsimile devices (e.g., Internet 16, mailer processing agent 20, etc.). Communication network 14 may be coupled with one or more destination facsimile devices and/or one or more nonfacsimile devices in any given application. Facsimile messages to be applied to more than one type of communication protocol device (e.g., destination facsimile device and Internet) may be referred to as a heterogeneous broadcast.

Scanner 24 provides an input which receives data to be communicated to the address(es) or location(s) identified by the respective destination designator(s). Provision of scanner 24 is exemplary and other input devices such as a floppy disk drive can be utilized to receive data to be communicated. Received destination designators and data are provided to memory 28.

Processor 26 is a digital microprocessor or controller in the described embodiment which executes a set of instructions stored in either software or firmware of originating facsimile device 12. Processor 26 provides user inputted destination designators into a facsimile protocol file in accordance with a preferred aspect of the invention. Processor 26 can construct the facsimile protocol file utilizing memory 28. An exemplary facsimile protocol file is a binary file transfer (BFT) file configured in accordance with a T.434 ITU-T Recommendation.

As described below, processor 26 may provide one or more destination designators within the facsimile protocol file of a single call connection. Such destination designators provided into the facsimile protocol file can include facsimile destination designators and nonfacsimile destination designators. The facsimile protocol file is preferably communicated from originating facsimile device 12 utilizing facsimile communications. Compression device 30 operates to massage the data into modified code to expedite facsimile communications from originating facsimile device 12. The compressed data stream generated within compression device 30 is applied to modem 32 which implements appropriate facsimile communications modulation. Modem 32 communicates the received data and facsimile protocol file using facsimile protocol communications. Such communications can occur over a public switched telephone network (PSTN) or other suitable media coupled intermediate originating facsimile device 12 and communication network 14. Line interface unit (LIU) 34 drives signals upon the public switched telephone network line and can accommodate various other configurations for increased flexibility.

Facsimile modem 32 communicates the data and facsimile protocol file in accordance with a T.30 ITU-T standard in one embodiment. The ITU-T T.30 standard provides a facsimile handshake protocol and describes a procedure for establishing and managing communications between two communicating facsimile devices. In general, the T.30 standard includes five phases (A–E) of operation for a call connection. Such includes call setup, pre-message procedure to select a desired communication mode, message transmission including phasing and synchronization, post-message procedure including confirmation, and call release providing disconnection of the call connection, respectively.

In one configuration, originating facsimile device 12 places an outgoing call to a destination device including a gateway (shown in FIG. 4) of communication network 14 to implement phase A. Upon reception of the call, the gateway goes off-hook. In one communications procedure, network access server hand-off (NASH) communications occur following the destination device going off-hook and prior to the transmission of a CNG beep from originating facsimile device 12. During such network access server hand-off communications, an authorization code and destination designator can be communicated to the destination device.

Network access server hand-off communications are preferably implemented using dual tone multiple frequency (DTMF) signaling. Such supports access similar to calling card access using facsimile device speed dial and provides more robust and reliable access. Additionally, facsimile device resident features of calling cards may be supported (e.g., programming with telephone numbers with embedded special dialing symbols, manual dialing, alternative network access procedures, selective use of auto-redialers).

This recommended hand-off access procedure preferably removes the requirement of superfluous framing (e.g., 123**321#) characters. The end of a hand-off field or field sequence may be indicated by a "#" character or a pause. Use of the "#" character permits a connected gateway to detect the end of variable length strings. Further, with the use of the "#" character, the originating facsimile device 12 has the option of sending an entire dialing sequence in a single uninterrupted burst whereby the receiving gateway or other destination device can buffer the entire sequence and post-process the received sequence.

More specific exemplary hand-off procedures for communications to the gateway include the originating facsimile device 12 dialing and ringing a point of presence (POP) of communication network 14. The point of presence goes off-hook and sounds a ready-to-receive tone. Originating facsimile device 12 sends an authorization code followed by the "#" character. The point of presence again sends a ready-to-receive tone. Originating facsimile device 12 sends a destination designator followed by the "#" character. The point of presence sends another ready-to-receive tone. The procedure for sending another destination designator may be repeated. Thereafter, originating facsimile device 12 terminates the hand-off procedure by sending a sole "#" character. Phase A of a T.30 communication procedure can resume after the sole "#" character.

Following appropriate hand-off operations, originating facsimile device 12 can communicate the CNG beep and receive a reply CED beep from the destination device including the point of presence of communication network 14. Following the return of the CED beep, phase B negotiations can be conducted. In other communication configurations, the network access server hand-off communications can occur during phase B negotiations, or during phase C transmissions.

Facsimile modem 32 of originating facsimile device 12 can communicate the facsimile protocol file and the data during plural respective phase C communications during a single call connection with the destination device. The network access server hand-off includes the destination designator if the originating facsimile device 12 will be communicating with a destination facsimile device. Alternatively, processor 26 indicates within the destination designator field of the network access server hand-off procedure that a distribution list including one or more destination designators follows within a facsimile protocol file. Such enables the communication of the data to destination devices identified within the distribution list utilizing possibly different (e.g., facsimile and/or nonfacsimile) communication protocols.

For example, in some situations, the destination designator cannot be represented as a simple relatively short sequence of DTMF digits. These situations occur when the destination designators to be communicated include nonfacsimile destination designators (e.g., email address or post office address) or are implemented in a heterogeneous distribution list including facsimile destination designators and nonfacsimile destination designators. An additional transmission process occurs in such situations. Namely, two distinct transmission phases (e.g., two phase C communications) within a single Group 3 or 4 connection can be utilized.

In accordance with one communications method, originating facsimile device 12 alerts the gateway that the destination designator(s) are forthcoming in a subsequent transmission phase. More specifically, originating facsimile device 12 can alert the gateway by the absence of a destination designator in the hand-off procedure (e.g., two sole "#" characters in the destination designator field rather than a sequence of digits representing a facsimile telephone number). The gateway recognizes the absence of the facsimile telephone number and will look for the destination designator(s) in a subsequent transmission.

Referring to FIG. 3, exemplary communications intermediate originating facsimile device 12 and communication network 14 are illustrated. FIG. 3 illustrates communications of data to at least one nonfacsimile device. A single call connection 50 is shown in accordance with the T.30 ITU-T standard. Call connection 50 includes a phase A communication 51, first phase B communication 52, first phase C communication 53, second phase B communication 54, second phase C communication 55, phase D communication 56 and phase E communication 57. An optional phase D communication (not shown) can occur intermediate first phase C communication 53 and second phase B communication 54.

More specifically, following initial phase A communication 51 and first phase B communication 52, originating facsimile device 12 can communicate the facsimile protocol file within first phase C communication 53 using T.434 binary file transfer. Following such communication, originating facsimile device 12 performs second phase B communication 54 and thereafter communicates the data inputted via scanner 24 within a subsequent phase C communication 55. The data is provided in a Tag Image File Format (TIFF) in one configuration.

Both the facsimile protocol file and the data are communicated during the single call connection 50 with communication network 14 in the described configuration. As such, the destination designator(s) within the facsimile protocol BFT file are communicated in a single call connection with the data to communication network 14. Thereafter, phase D, E communications 56, 57 can occur intermediate originating facsimile device 12 and communication network 14.

In one aspect, the first transmission phase C communication 53 negotiated is a T.30 binary file transfer (BFT) digital command signal (DCS) (using the setting bit number 53 of the digital identification signal (DIS) or digital transmit command (DTC)) with T.434 BFT compliant attributes. This phase transports the facsimile protocol file (e.g., ASCII file) containing one or more nonfacsimile destination designators, or a heterogeneous broadcast addressee list. For heterogenous broadcast lists, the binary file can contain a simple newline character delimited list of post office addresses, email addresses and/or facsimile telephone numbers individually terminated with a null character (standard format for a UNIX text file).

Email addresses within a binary file transfer (BFT) file of phase C communication 53 may be provided in the form specified by a RFC 822 "Standard For the Format of ARPA Internet Text Messages" (e.g., from: Paul Kramer <pk@zz.com> [CRLF] to: John Wolf <jwolf@xyz.com>, [CRLF] [LWSP] Matt Helms <mhelms@xyz.com> [CRLF] bcc: Fred Krenwell <fken@xyz.net> [CRLF]). Facsimile telephone numbers within a binary file transfer (BFT) file may be provided in the form specified by RFC 822 where telephone numbers are used in place of email addresses (e.g., from: Paul Kramer <12085551212> [CRLF] to: John Wolf <409993458679>, [CRLF] [LWSP] Matt Helms <18735558764> [CRLF] bcc: Fred Krenwell <3698734348727> [CRLF]).

Postal service delivery may be indicated within a binary file transfer (BFT) file in the form specified by RFC 822 where postal numbers are used in place of email addresses (e.g., from: Paul Kramer <120 Main St., Milwaukee, Wis., 85551> [CRLF] to: John Wolf <4903 4th St., Boise, Id., 83707>, [CRLF] [LWSP] Matt Helms <18 Crescent Dr., Los Angeles, Calif., 98937> [CRLF] [LWSP] bcc: Fred Krenwell <455 Rainbow Lane, Apt. #3B, New York, N.Y., 89980> [CRLF]). [CRLF] and [LWSP] refer to carriage return line feed and linear white space ASCII characters, respectively.

For facsimile messages for heterogeneous broadcast, the heterogeneous distribution list may be provided in the form specified by RFC 822 where postal addresses and telephone numbers are used in place of email addresses where appropriate (e.g., from: Paul Kramer <120 Main St., Milwaukee, Wis., 85551> to: John Wolf <jwolf@xyz.com>, Matt Helms <18735558764> bcc: Fred Krenwell <455 Rainbow Lane, Apt. #3B, New York, N.Y., 89980>).

The second transmission phase C communication 55 is the scanned image that embodies the communication content (i.e., TIFF data) of the facsimile to be directed to the named addressees.

Personalized facsimile pages may be provided for communications including heterogeneous broadcasts. Processing, personalizing and transmitting cover sheets or selected personalized facsimile pages occur at a provider's network email and facsimile server node in one configuration. Originating facsimile device 12 sources personalization information with the broadcast list of destination designators and facsimile content data in one arrangement.

According to one exemplary method, the BFT transmission within the first phase C communication 53 includes a personalized cover sheet template in addition to the destination designator(s). Servers of communication network 14 process and merge the template and personalized text. Another method utilizes offset parameters and page specifications in the BFT phase to overlay personalized TIFF images over selected pages of the data including the transmitted facsimile image, also a TIFF image in the described configuration. Such personalization can mirror operations of conventional facsimile devices.

Referring to FIG. 4, details of communication network 14 are described. Communication network 14 is adapted to direct received data from originating facsimile device 12 to various associated communication systems. Such associated communication systems can include facsimile communication systems (e.g., destination facsimile device 18) and nonfacsimile communication systems (e.g., Internet 16, mailer processing agent 20, etc). Data is directed to selected ones of the associated communication systems according to facsimile and nonfacsimile destination designators provided by originating facsimile device 12 as previously described.

The depicted communication network 14 includes a gateway 40, gatekeeper 42, heterogeneous broadcast server 44, email server 46, facsimile broadcast server 48, and postal mail preprocess and transport server 49. As depicted, gateway 40 is connected with originating facsimile device 12. Email server 46, facsimile broadcast server 48 and postal mail preprocess and transport server 49 are coupled with the respective communication systems including the Internet 16, destination facsimile device 18 and mailer processing agent 20 in the depicted configuration.

One configuration of communication network 14 utilizes Internet Protocol communications. More specifically, communication network 14 may be configured as a packet-switched (ITU-T x.25) network. Gateway 40 receives analog communications from originating facsimile device 12. Gateway 40 converts the received analog communications from originating facsimile device 12 into digital packets in accordance with Internet Protocol communications. Exemplary digital packets may be created in accordance with a T.32 ITU-T standard.

Gatekeeper 42 operates to analyze destination designators received within communications from originating facsimile device 12. Gatekeeper 42 instructs gateway 40 to direct received communications to a respective one or more of the associated servers within communication network 14. For example, if a single communication system is to be utilized to communicate the data, gatekeeper 42 can instruct gateway 40 to direct the communication directly to one of email server 46, facsimile broadcast server 48 or postal mail preprocess and transport server 49.

Alternatively, if the received message from originating facsimile device 12 is a heterogeneous broadcast communication, gatekeeper 42 can instruct gateway 40 to direct the message to heterogeneous broadcast server 44. Broadcast server 44 operates to parse the message as described below to provide appropriate heterogeneous communications according to the addressee distribution list of the heterogeneous broadcast. Following the parsing operations, broadcast server 44 forwards the destination designators and data (e.g., TIFF image) to the appropriate servers 46, 48, 50.

Email server 46 implements communication operations utilizing Sendmail UNIX software in accordance with one configuration. Facsimile broadcast server 48 communicates the data to destination facsimile device 18 or other device in accordance with a T.37 ITU-T standard. Mail preprocess and transport server 49 communicates the data to associated mailer processing agent 20 which is a direct mail producer or related technology.

Referring to FIG. 5, communications from originating facsimile device 12 to one or more destination devices using a single communication protocol (i.e., one of the communication systems coupled with communication network 14) are described. Initially, at step S10, originating facsimile device 12 establishes a call connection with a point of presence (POP) of communication network 14. Following establishment of the call connection, gateway 40 at the point of presence goes off hook and provides a ready-to-receive indication at step S12. At step S14, originating facsimile device 12 communicates a destination designator and ingress authorization to gateway 40. Step S14 can be implemented in a preamble before actual message transmission.

Thereafter, gateway 40 determines whether valid authorization was received at step S16. If valid authorization was not received, the call connection is terminated at step S18. Otherwise, gateway 40 passes the received destination designator to gatekeeper 42 at step S20. The destination designator can comprise an actual address in telephony-numeric form for facsimile communications, or a predetermined telephony-numeric code that indicates to gatekeeper 42 the message form and the position of the actual destination designator(s) which may be embedded in a pending message transmission (e.g., within a BFT file to be communicated during phase C). Destination designators for nonfacsimile communications provided in the subsequent communication are analyzed by gatekeeper 42.

Gatekeeper 42 attempts to determine an appropriate route within communication network 14 or a possible address translation at step S22. In one configuration, gatekeeper 42 searches a local or remote database (not shown) and compares the received destination designator(s) for determination of a route within communication network 14 or possible address translation. In respect to this invention, the ubiquitous facsimile is limited in the variety of address specification and input. This is due to the telephony keypad input device used by facsimiles to accommodate facsimile addresses, i.e., destination fax telephone numbers. Such keypads are limited to the digits of 0 through 9 and the '*' and '#' DTMF characters. Therefore, an encoding scheme beyond the ITU-T T.30 protocol may be utilized to specify destination address forms other than those of the switched telephone network. A recommended encoding scheme is to use predetermined sequences of telephony keypad characters that are meaningful to the gatekeeper of the contacted packet switched network that are not necessarily meaningful to the PSTN.

At step S24, it is analyzed whether a route and/or an address translation was determined. If not, the call connection is terminated at step S18. Otherwise, gatekeeper 42 passes the determined route and/or the address translation to gateway 40 at step S26. Thereafter, gateway 40 commences and facilitates message ingress and forwards the call connection at step S28 to a designated server within communication network 14 responsive to indication from gatekeeper 42.

Referring to FIG. 6, communication operations of a heterogeneous broadcast message are described. Such broadcast messages communicate the data to plural destinations using communication systems having different protocols. Initially, gateway 40 identifies the received message as a heterogeneous broadcast message and commences and facilitates message ingress and forwards or establishes a call connection to broadcast server 44 of communication network 14 at step S40.

The message can include binary text and/or image data, and a destination designator distribution list. At step S42, broadcast server 44 separates the message portion including any text and image data from the destination designator distribution list. Broadcast server 44 proceeds to parse the destination distribution list at step S44. At step S46, broadcast server 44 sorts the list and separates destination designators according to form and medium of communication protocols representative of their respective destination designators. For example, the distribution list of destination designators may be separated into lists including a list of email destination designators, a list of facsimile destination designators, a list of postal address destination designators, etc.

At step S48, broadcast server 44 attaches a copy of the message portion (e.g., data to be communicated) to the individual separated destination designator lists generated within step S46. Thereafter, distribution lists with the individually attached message data are forwarded to respective communication protocol servers 46, 48, 50 to be processed for subsequent delivery at step S50. Thereafter, the appropriate servers 46, 48, 50 can forward the message portion to the associated facsimile and/or nonfacsimile communication system (e.g., Internet 16, destination facsimile device 18, mailer processing agent 20, etc.) for delivery of the data to appropriate addresses identified by the respective destination designators.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A facsimile communication device comprising:
   a first input configured to receive a nonfacsimile destination designator;
   a second input configured to receive data to be communicated to an address identified by the nonfacsimile destination designator;
   a processor configured to provide the nonfacsimile destination designator within a facsimile protocol file; and
   a facsimile modem coupled with the second input and adapted to communicate, using facsimile protocol communications, the data and the facsimile protocol file.

2. The facsimile communication device according to claim 1 wherein the facsimile modem is configured to communicate the data and the facsimile protocol file in accordance with a T.30 ITU-T standard.

3. The facsimile communication device according to claim 1 wherein the facsimile modem is configured to communicate the facsimile protocol file and the data during plural respective phase C communications of the T.30 ITU-T standard during a single call connection.

4. The facsimile communication device according to claim 1 wherein the processor is configured to provide the nonfacsimile destination designator within the facsimile protocol file comprising a BFT file.

5. The facsimile communication device according to claim 1 wherein the first input is configured to receive a facsimile destination designator and the processor is configured to provide the facsimile destination designator in the facsimile protocol file.

6. The facsimile communication device according to claim 1 wherein the first input is configured to receive plural destination designators and the processor is configured to provide the received plural destination designators within the facsimile protocol file.

7. A communication system comprising:
   a facsimile device including a facsimile modem and the facsimile device being configured to receive a nonfacsimile destination designator and data to be communicated to an address identified by the nonfacsimile destination designator, the facsimile device being further configured to provide the nonfacsimile destination designator into a facsimile protocol file and to communicate, using facsimile protocol communications, the data and the facsimile protocol file to a communication network using the facsimile modem; and
   a communication network adapted to direct the data to the address identified by the nonfacsimile destination designator.

8. The communication system according to claim 7 wherein communication network is configured to communicate the data using internet protocol communications.

9. The communication system according to claim 7 wherein the communication network includes at least one of an email server and a postal mail preprocess and transport server individually configured to communicate the data responsive to the nonfacsimile destination designator.

10. The communication system according to claim 7 wherein the facsimile device is further configured to receive and provide a facsimile destination designator into the facsimile protocol file and the communication network further includes a facsimile server configured to direct the data to an address identified by the facsimile destination designator.

11. The communication system according to claim 7 wherein the communication network is adapted to couple with a nonfacsimile communication system and to communicate the data to the nonfacsimile communication system responsive to the nonfacsimile destination designator.

12. The communication system according to claim 7 wherein the facsimile device is configured to communicate the data and the facsimile protocol file in accordance with a T.30 ITU-T standard.

13. The communication system according to claim 7 wherein the facsimile device is configured to provide the nonfacsimile destination designator within the facsimile protocol file comprising a BFT file.

14. The communication system according to claim 7 wherein the facsimile device is configured to communicate the data and the facsimile protocol file including the nonfacsimile destination designator to the communication network in a single call connection.

15. A facsimile communication method comprising:

provide a facsimile communication device including a facsimile modem;

receiving a nonfacsimile destination designator within the facsimile communication device;

receiving data to be communicated to an address identified by the nonfacsimile destination designator within the facsimile communication device;

providing the nonfacsimile destination designator within a facsimile protocol file; and communicating, using facsimile protocol communications, the data and the facsimile protocol file using the facsimile modem.

16. The facsimile communication method according to claim 15 wherein the communicating comprises communicating the data and the facsimile protocol file in accordance with a T.30 ITU-T standard.

17. The facsimile communication method according to claim 15 wherein the providing the nonfacsimile destination designator includes providing the nonfacsimile destination designator within a BFT file.

18. The facsimile communication method according to claim 15 wherein the receiving comprises receiving plural destination designators, and further comprising providing the destination designators within the facsimile protocol file.

19. The facsimile communication method according to claim 15 further comprising:

receiving a facsimile destination designator; and providing the facsimile destination designator within the facsimile protocol file.

20. The facsimile communication method according to claim 15 wherein the communicating comprises communicating during a single call connection.

* * * * *